United States Patent

[11] 3,577,952

[72] Inventor Hiroshi Tado
  Suita-shi, Japan
[21] Appl. No. 859,744
[22] Filed Sept. 22, 1969
[45] Patented May 11, 1971
[73] Assignee Yanmar Diesel Engine Co. Ltd.
  Kita-ku, Osaka, Japan
[32] Priority Sept. 30, 1968
[33] Japan
[31] 43/85326

[54] EXHAUST SYSTEM OF PROPELLER FOR SHIPS
  1 Claim, 4 Drawing Figs.
[52] U.S. Cl. ................................................ 115/17
[51] Int. Cl. ......................................... B63h 21/34
[50] Field of Search ................................. 115/17;
  181/60, 70

[56] References Cited
UNITED STATES PATENTS
| | | | |
|---|---|---|---|
| 2,144,631 | 1/1939 | Kurth | 181/60X |
| 3,310,022 | 3/1967 | Kollman | 115/17 |

*Primary Examiner* — Andrew H. Farrell
*Attorney* — Stevens, Davis, Miller & Mosher ABSTRACT: An exhaust tube is mounted in an exhaust pipe connected to the exhaust port of the engine of a propeller apparatus. A deflector member defining obliquely radially extending channels and having a concaved outer surface is provided at the lower end of the exhaust tube integrally therewith, so as to divert the path of gas flow in the exhaust pipe and also repulse the water particles sucked up by being entrained by the wave of negative pressure of the engine reflecting on the surface of water present in the lower portion of the exhaust pipe.

PATENTED MAY 11 1971
3,577,952
FIG. 1
FIG. 2
FIG. 3
FIG. 4
PRIOR ART
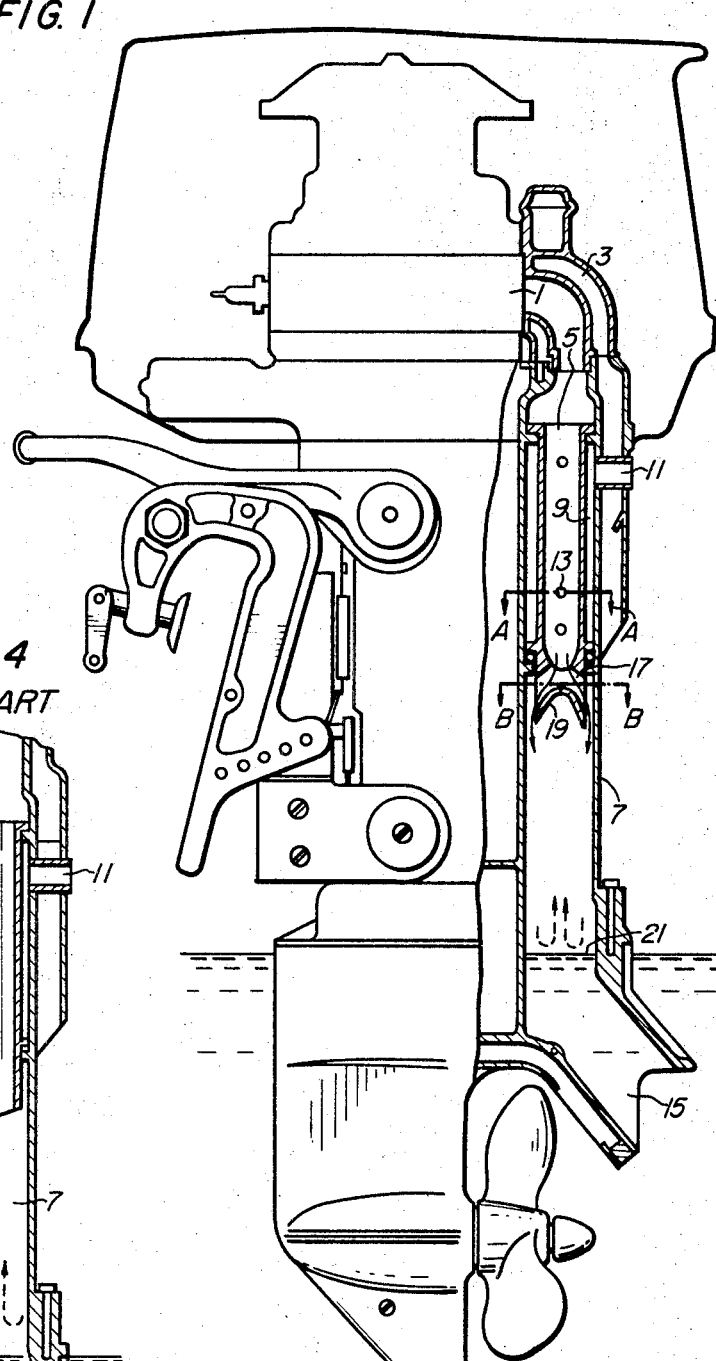
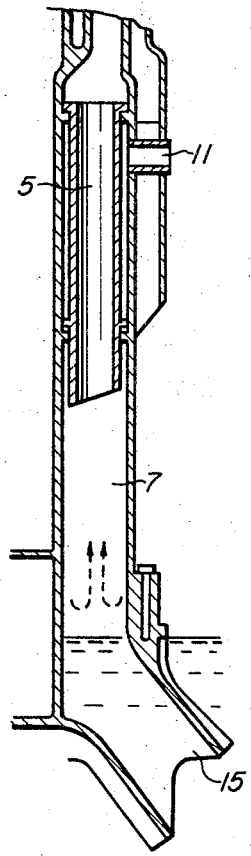
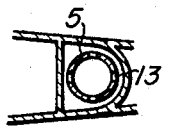
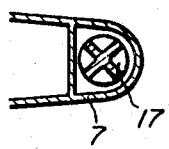
INVENTOR
HIROSHI TADO
BY
Stevens, Davis, Miller & Mosher
ATTORNEYS

EXHAUST SYSTEM OF PROPELLER FOR SHIPS

This invention relates to improvements in the exhaust system of an outboard propeller for ships, through which the exhaust gas of the engine is discharged into water.

In a propeller for ships, the distance between the exhaust port of the engine through which the exhaust gas of the engine is discharged into water and the level of water in the exhaust pipe which is expelled by the exhaust gas is generally subjected to a structural limitation and a sufficient difference in height can hardly be had in most cases. Therefore, in the expansion stroke of the engine in the early stage of the engine starting operation, there occasionally occurs such undesirable phenomenon that the water in the terminal end portion of the exhaust pipe is sucked into the cylinder under negative pressure created in the cylinder, resulting in unsatisfactory starting of the engine, or an abnormal wear or corrosion of the same. The tendency of such undesirable phenomenon becomes more apparent as the volume of a single cylinder becomes larger, because the negative pressure created in the cylinder becomes stronger with the volume of the cylinder.

In order to alleviate such shortcoming of the conventional exhaust system, the present invention proposes to provide a deflector member on the exhaust tube constituting part of the exhaust passage, which deflector member is adapted to temporarily divert the flow of gas from the axial line of the exhaust passage, whereby although the exhaust gas is again led to proceed in the axial direction of the exhaust passage by the wall of said passage after having been diverted by said deflector and discharged into water, the wave reflecting on the water surface is re-reflected on the undersurface of the deflector and as a result the intensity of the reflected wave reaching the exhaust port of the engine is attenuated. Namely, according to the present invention there is provided an exhaust system for exhausting the gas of a propeller for ships into water, which comprises an exhaust pipe connected to the exhaust port of the engine and an exhaust tube mounted in said exhaust pipe, said exhaust tube having a deflector member connected to the lower end thereof which has an inwardly convexed outer bottom surface and defines oblique radial channels. The exhaust system of the invention being constructed as described above, the negative pressure wave generated in the cylinders and reflecting on the surface of water present in the terminal end portion of the exhaust pipe is reflected again on the outer bottom surface of the deflector member, provided on the exhaust tube, to proceed toward the surface of water, so that the reflected wave of the negative pressure propagating toward the exhaust port of the engine can substantially be attenuated.

Consequently, the water particles sucked up along with the reflected wave of negative pressure are repulsed toward the surface of water by the deflector member. Since the reflected wave of negative pressure is substantially attenuated in the manner described above and the time when said reflected wave reaches the exhaust port of the engine is delayed due to the deflected passageway for the exhaust gas, the intrusion of water into the cylinders is prevented and thus the object of the invention can be attained.

In order that the present invention may be more clearly understood, reference is had to the accompanying drawings which illustrates the present invention and in which:

FIG. 1 is a vertical sectional view of the exhaust system according to the present invention, connected to an outboard motor;

FIGS. 2 and 3 are sectional views taken along the lines A-A and B-B of FIG. 1 respectively; and FIG. 4 is a fragmentary vertical sectional view of a conventional exhaust system for outboard motor.

According to the present invention, as shown in FIGS. 1, 2 and 3, an engine 1 is connected to an exhaust pipe 7 of the outboard motor through a connecting pipe 3. An exhaust tube 5 is disposed in the exhaust pipe 7, with the top end thereof secured to the upper portion of the latter. At the top end portion of the exhaust pipe 7 is provided a bypass port 11. The interior of the exhaust tube 5 is communicated with the atmosphere through passage holes 13 formed through the peripheral wall of said exhaust tube, an annular chamber 9 formed between the outer peripheral surface of said exhaust tube 5 and the inner peripheral surface of the exhaust pipe 7, and the bypass port 11. The lower end of the exhaust tube is provided with a deflector member integrally therewith which defines obliquely extending radial channels 17 and the outer face 19 or the face remote from the exhaust tube 5 of said deflector member is concaved towards the engine.

During cruising, a major portion of the exhaust is discharged into water through the outlet end portion 15 of the exhaust pipe which is held below the surface of water. A negative pressure developed in the cylinders in the initial stage of starting the engine and propagating through the exhaust passage in the form of a plane wave passes through the radial channels 17 collides against the water surface 21, again in the form of a plane wave, and is reflected on said water surface to proceed in a reverse direction. The reflected wave is re-reflected on the concaved outer surface 19 of the deflector member. Therefore, the water particles entrained by the reflected wave are mostly separated therefrom and at the same time the reflected wave is substantially damped, and part of the damped wave only is propagated to the engine through the radial channels 17. In this case, since the velocity of the reflected wave propagating back to the engine is slowed down during its passage through the channels in the deflector member and accordingly the duration of the reflected wave reaching the exhaust port of the engine in the period when said exhaust port is open is shortened, whereby the amount of water intruding into the engine is drastically reduced. A conventional exhaust tube is simply open straight at its lower end as shown in FIG. 4. In the construction nothing interferes with the rectilinear propagation of the reflected wave of negative pressure, so that the water sucked up under strong negative pressure proceeds straight into the exhaust port of the engine. When the negative pressure wave moves backwardly in the exhaust pipe, air is sucked into said exhaust pipe through the bypass port 11 to mitigate the negative pressure to some extent but not to such an extent as to substantially moderate the suction of water. In the present invention, the gas passage channels formed in the deflector member extend obliquely radially, so that the flow resistance of the exhaust tube is not substantially changed as compared with that of the conventional exhaust tube shown in FIG. 4. Therefore, the object of improvement can sufficiently be attained without causing a loss of the engine output or other undesirable effects.

Although the present invention has been described and illustrated herein as applied to an outboard motor, it is to be understood that the present invention is not restricted only to the outboard motor but a propeller apparatus of the type in which the engine is mounted in a ship and the propeller only is mounted outboard and an inboard motor, in which the principle of the invention can be embodied, are also included within the scope of the present invention.

I claim:

1. An exhaust system of a propeller for ships through which the exhaust of the propeller is discharged into water, said exhaust system comprising an exhaust pipe connected to the exhaust port of an engine and an exhaust tube mounted in said exhaust pipe, said exhaust tube being provided at its lower end with an integral deflector member which defines obliquely radially extending channels and has a concaved outer face.